Sept. 16, 1941.  T. WATTER  2,256,331

PLATE FASTENER

Filed Oct. 30, 1940

INVENTOR
Theophila Watter
BY
ATTORNEY

Patented Sept. 16, 1941

2,256,331

UNITED STATES PATENT OFFICE 2,256,331

PLATE FASTENER

Theophila Watter, Huntington, N. Y.

Application October 30, 1940, Serial No. 363,408

6 Claims. (Cl. 24—221)

My invention relates to improvements in fasteners, particularly devices for readily connecting two separate plates or elements, and more particularly my invention relates to a fastener suited for fastening together the parts of aircraft cowling or other aircraft parts and other constructions in which two plates are to be connected.

In the known devices of this kind generally one spring was used which made the constructions unyielding and which in a short time deteriorated and became useless soon causing the parting of the plates connected by the fastener, and which moreover were comparatively heavy and thus unduly increased the weight of the aircraft.

The fastener according to my invention avoids all these disadvantages by the use of a spring wire counterpart possessing enormous flexibility and yielding conducive to positive safety for the parts connected, a fact which is particularly important in aircraft construction, and which furthermore decreases perceptibly the weight of the aircraft as it is made from light weight material.

Furthermore, the fastener constructed according to my invention is compact and less protruding, thus saving the expenses of channels and other auxiliary means to which the fastener is attached contributing further to a reduction in weight, labor and material and time of construction.

These and other advantages and objects of my invention will become more fully apparent as the description thereof proceeds and will then be specifically defined in the appended claims.

In the accompanying drawing forming a material part of this disclosure:

Figure 1:
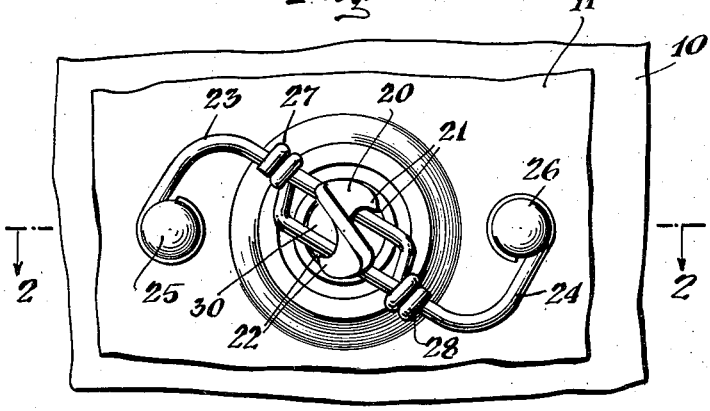
Fig. 1 is a top plan view of a fastener constructed according to my invention.
Figure 2:
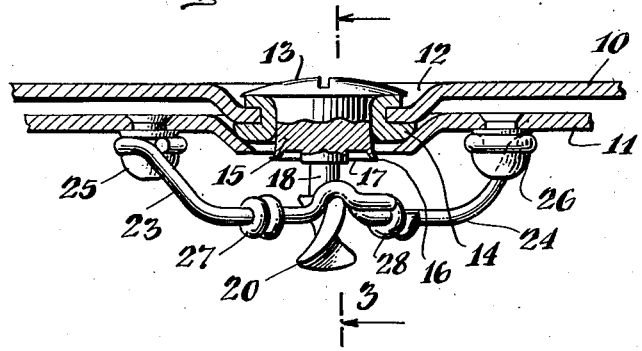
Fig. 2 is a longitudinal section through the fastener on line 2—2 of Figure 1.
Figure 3:
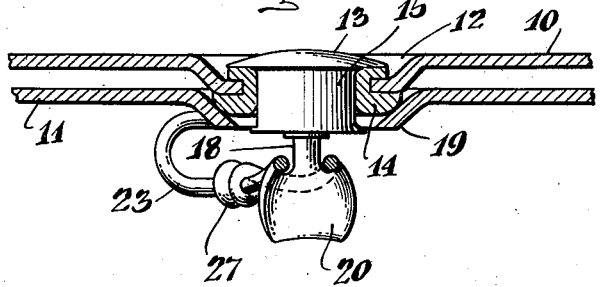
Fig. 3 is a cross-section through the fastener on line 3—3 of Figure 2.

As illustrated, the two plates 10 and 11 of for instance an aircraft cowling or other parts to be connected according to my invention are fastened to one another in the following manner:

The plate 10 has in approximately its center an opening surrounded by a seat 12 on one face of the plate for the seating of the head 13 of a clamping button 15, and at its opposite face the plate 10 has a boss 14 formed therewith having a somewhat smaller opening for the seating of the button 15. The button has a centrally located depression 17 formed by a protruding circular edge 16. From the center of this depression 17 a stud 18 or the like extends through an opening in one face of the plate 11 through which also extends the inner part of the button 15. The opening of the plate 11 has on one face a seat for the boss 14 of plate 10 and on the other face its opening is surrounded by a marginal flange 19. The head 20 of the stud 18 has a peculiar shape approximately spiral shaped in top plan view and having the ends of the spiral formed into two oppositely directed shoulders 21, 22 adapted to engage the intermediate parts of the springs 23, 24, the outer ends of the springs are secured to buttons 25, 26 or the like on plate 11, and the inner end of spring 24 is wound about spring 23 beyond its point of engagement by the shoulder of the head 22, as at 27, while the inner end of spring 23 is wound about the spring 24 beyond the point of engagement by the shoulder of the head marked 21 as indicated at 28.

In Fig. 4 I have shown a steel punch or tool 29 for the purpose of flaring the edge 16 of the button 15 outwardly about the depression in the end of the button so that the button cannot fall out of the openings in the plates and the latter are firmly connected.

In operation, the button is passed through the central openings in the plates 10 and 11, and the head 13 is seated in seat 12 of plate 10 while the button and the stud 18 with its head are passed through the openings in plates 10 and 11 after the edge 16 has been flared outwardly by the operation of special tool so that the button cannot again be withdrawn or fall out of the openings. The springs 23 and 24 are secured with their outer ends to the buttons 25 and 26 on the plate 11, and their inner ends are wound about the springs intermediate their ends as indicated at 27 and 28 so that the end of spring 24 is wound about spring 23 and the inner end of spring 23 is wound about spring 24. The intermediate ends of the springs are somewhat bent outwardly so as to leave a space 30 allowing the passage of the head 20 of the stud. If now by means of a suitable tool engaging the slot in head 13 of the stud the same is turned, the shoulders 21, 22 of the head 20 will engage the springs as indicated, and the plates 10 and 11 are firmly united. It will be clear that the construction makes allowance for a certain yielding to prevent a breaking under certain stresses without allowing a separation of the parts which still further be prevented by the engagement of the outwardly flaring edge of the button with the boss 14 so as to avoid loss of the button when the same is turned to disengage the shoulders of its head from the springs, and it will be understood that I have provided a plate fastener which is compact and can be made of light weight metal, thus considerably decreasing the weight of the aircraft which must be considered an important advantage besides allowing a speedy mounting and dismounting and consequent saving in labor, time and expense.

It will be understood that I have shown and described the preferred form of my device only as one example of the many possible ways to practically construct the same, and that I may make such changes in the general arrangement of my fastener and in the construction of its minor details as come within the scope of the appended claims without departure from the spirit of my invention and the principles involved.

Having thus described my invention, what I claim as new, and desire to secure by Letters Patent is:

1. A light-weight plate fastening device as described comprising a pair of companion springs having one of their ends secured to one of the plates, and their other ends wound about the relative companion spring to yieldingly connect both springs, and a means on the other of said plates to be engaged by said springs to produce a yielding yet firm connection of both plates.

2. A light-weight fastening device for connecting two plates comprising a pair of wire springs attached at one of their ends to one of said plates, one of said springs forming the counterpart for the other, and means for yieldingly connecting the end of one spring with the other spring, and a button passed through the other of said plates to be engaged by said springs intermediate their ends upon the turning of said button for connecting both plates.

3. In a fastener as described, for connecting a pair of plates, a pair of springs, buttons on one of said plates to which the outer ends of said springs are attached, the inner ends of said springs each wound about the other spring of said pair intermediate their ends and bent to leave a space therebetween, and a button seated in the other plate adapted to be passed through said space between the springs adapted to be engaged by said springs to firmly unite both plates.

4. In a fastening device of the character described for uniting two plates, preferably of an aircraft cowling, a stud on one of said plates, and wire springs fastened at one end to the other of said plates and wound with their other ends about the other companion spring so as to leave a space between both springs for the passage of said stud to be engaged by said springs at opposite points to firmly connect said stud and springs and thus also the plates.

5. A fastening device as described, for connecting two plates comprising two springs having their outer ends secured to buttons on one of said plates and the inner end of each one of said springs wound about the other spring intermediate its ends, the intermediate portions of said springs bent outwardly to provide a space, and means on the other of said plates passing through said space to be engaged by said springs for producing a yielding, yet strong connection of both plates.

6. In a fastening device as described for uniting two plates, two springs having their outer ends secured to one of said plates, the inner ends of said springs each wound about the other spring intermediate the ends thereof, the intermediate portions of said springs bent outwardly to provide a space for the passage of a means adapted to be engaged by said springs on opposite sides for providing a yieldable, yet firm connection of both plates.

THEOPHILA WATTER.